US012791572B2

(12) United States Patent
Furukawa et al.

(10) Patent No.: US 12,791,572 B2
(45) Date of Patent: Nov. 10, 2026

(54) AUTOMATIC ANALYZER AND METHOD OF OPERATING AUTOMATIC ANALYZER

(71) Applicant: Hitachi High-Tech Corporation, Tokyo (JP)

(72) Inventors: Maki Furukawa, Tokyo (JP); Masashi Akutsu, Tokyo (JP); Naoto Suzuki, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 967 days.

(21) Appl. No.: 17/597,437

(22) PCT Filed: Mar. 13, 2020

(86) PCT No.: PCT/JP2020/011168
§ 371 (c)(1),
(2) Date: Jan. 6, 2022

(87) PCT Pub. No.: WO2021/005835
PCT Pub. Date: Jan. 14, 2021

(65) Prior Publication Data
US 2022/0260601 A1 Aug. 18, 2022

(30) Foreign Application Priority Data
Jul. 10, 2019 (JP) ................................ 2019-128082

(51) Int. Cl.
*G01N 35/02* (2006.01)
*G01N 35/10* (2006.01)

(52) U.S. Cl.
CPC ....... *G01N 35/025* (2013.01); *G01N 35/1002* (2013.01); *G01N 35/1004* (2013.01)

(58) Field of Classification Search
CPC ............. G01N 35/025; G01N 35/1002; G01N 35/1004
See application file for complete search history.

(56) References Cited

U.S. PATENT DOCUMENTS 4,965,049 A * 10/1990 Lillig .................... G16H 10/40 D24/231
5,408,891 A * 4/1995 Barber .............. G01N 35/1004 73/864.22

FOREIGN PATENT DOCUMENTS

JP 2001133466 A * 5/2001
JP 2011-78881 A 4/2011
JP 2015-129659 A 7/2015

OTHER PUBLICATIONS

International Search Report (PCT/ISA/210) issued in PCT Application No. PCT/JP2020/011168 dated Jun. 2, 2020 with English translation (five (5) pages).
(Continued)

*Primary Examiner* — Charles Capozzi
*Assistant Examiner* — Michael Stanley Gzybowski
(74) *Attorney, Agent, or Firm* — Crowell & Moring LLP

(57) ABSTRACT

Provided are an automatic analyzer that satisfies both rapid measurement start and water consumption reduction, and a method of operating the automatic analyzer. When the automatic analyzer (100) is in a standby state where measurement of a sample is acceptable, a supply amount of cleaning water supplied to a sample dispensing probe (113) that dispenses the sample to a reaction vessel for reaction of the sample and a reagent, a sample dispensing probe cleaning tank (113A) that cleans an outer periphery of the sample dispensing probe (113) after the sample is dispensed, a reagent dispensing probe (116) that dispenses the reagent to the reaction vessel, a reagent dispensing probe cleaning tank (116A) that cleans an outer periphery of the reagent dispensing probe (116) after the reagent is dispensed, and a cleaning mechanism (115A) that cleans the reaction vessel after the measurement is completed, is reduced to be smaller than a supply amount during the measurement of the sample.

5 Claims, 14 Drawing Sheets

(56) References Cited

OTHER PUBLICATIONS

Japanese-language Written Opinion (PCT/ISA/237) issued in PCT Application No. PCT/JP2020/011168 dated Jun. 2, 2020 (five (5) pages).

* cited by examiner

[FIG. 1]
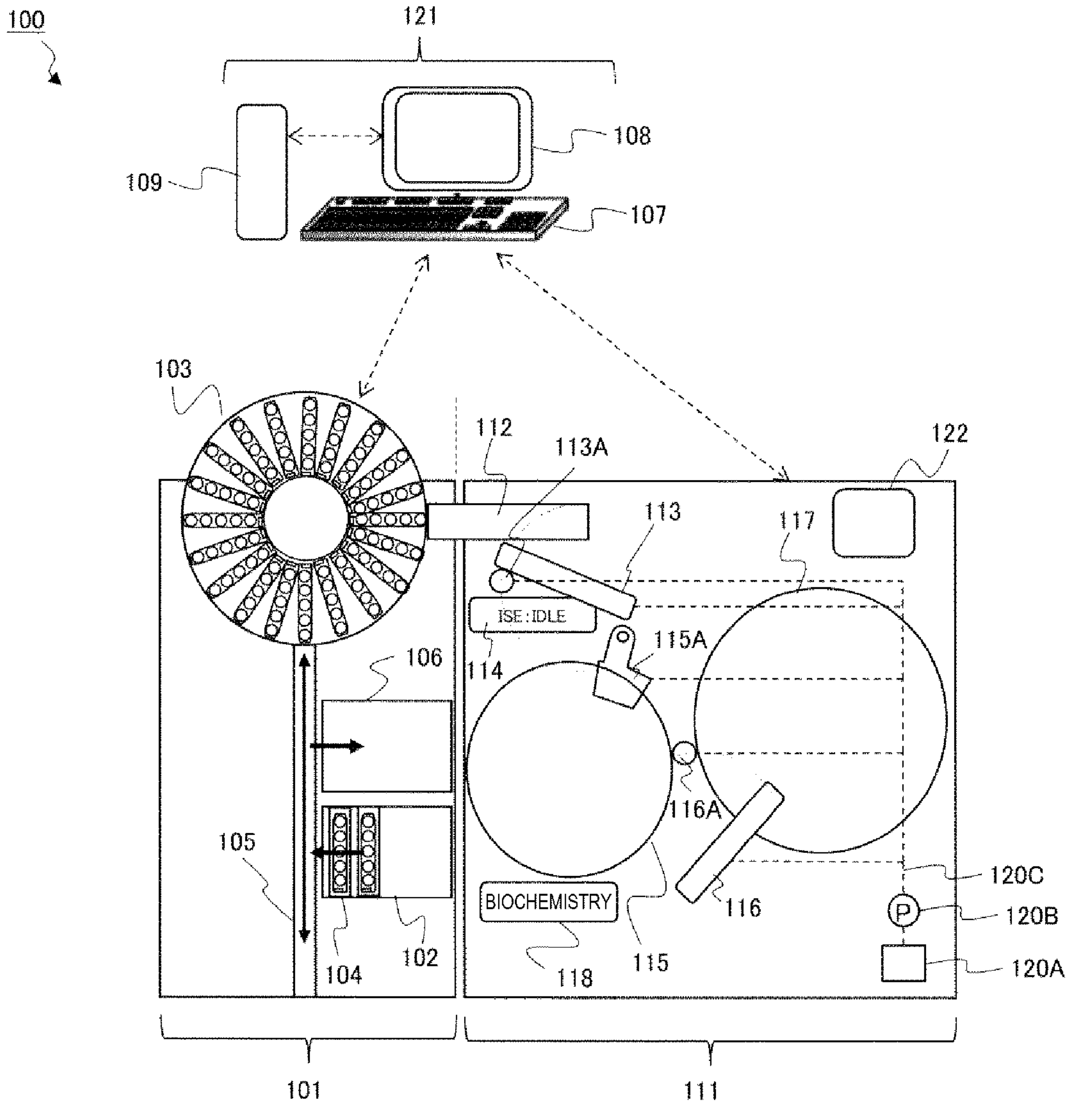

[FIG. 2]
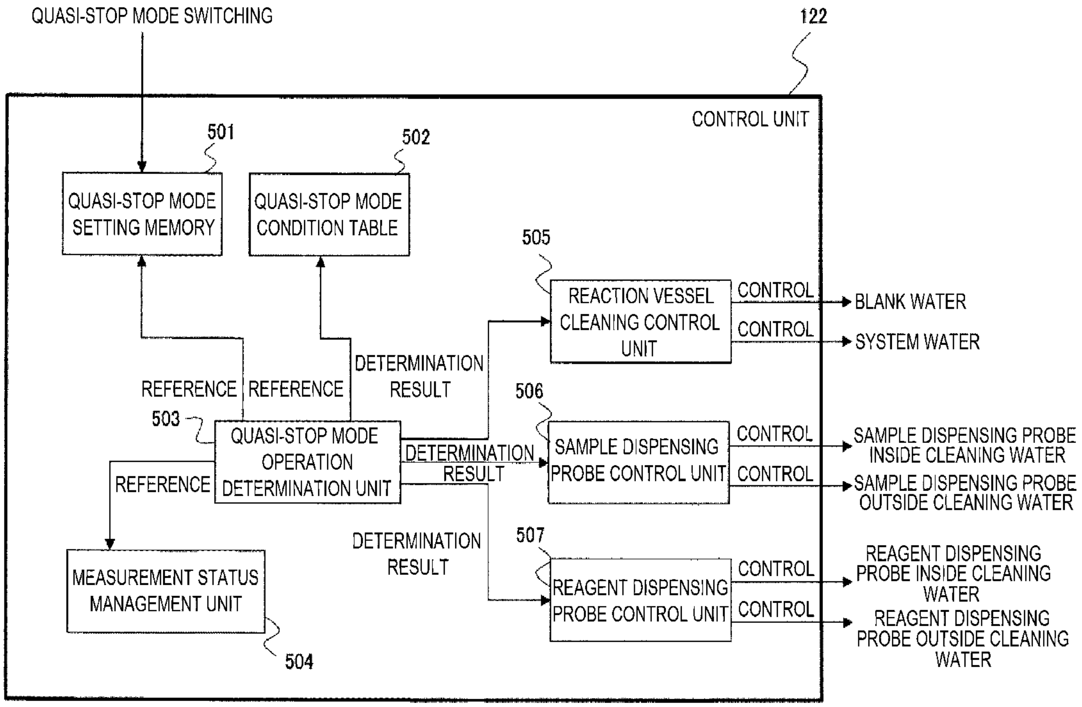

[FIG. 3]

| STOP CONDITION | START CONDITION |
|---|---|
| (A) COMPLETE DISPENSING OF ALL SAMPLES | (a) START SAMPLE CONVEYANCE |
| (B) COMPLETE DISPENSING OF ALL REAGENTS | (b) START SAMPLE DISPENSING |
| (C) COMPLETE OUTPUT OF ALL MEASUREMENT RESULTS | (c) START REAGENT DISPENSING |
| (D) NO STOP | — |

[FIG. 4]
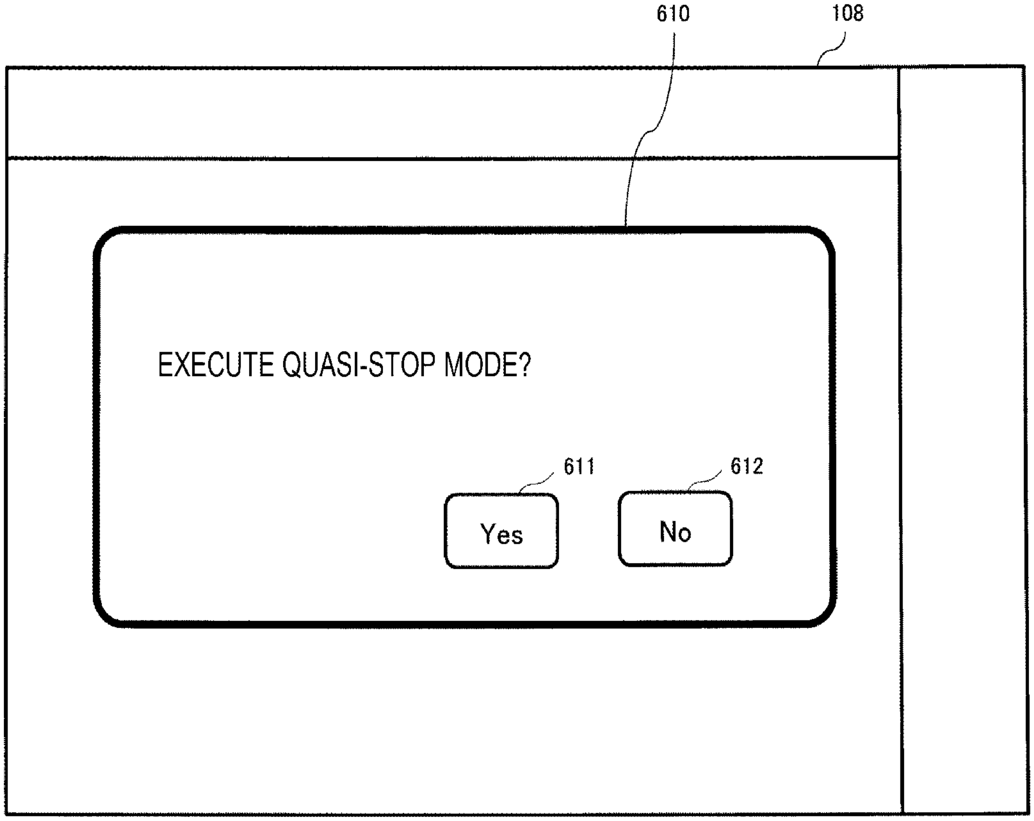

[FIG. 5]
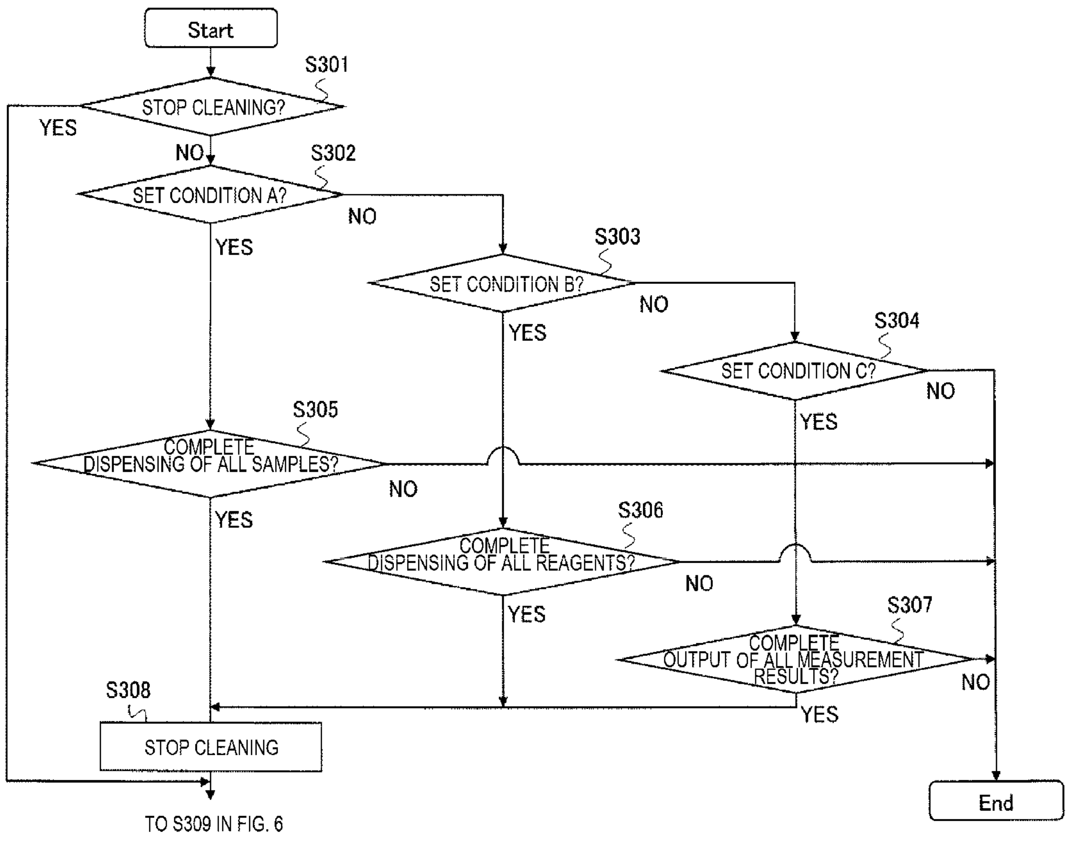

[FIG. 6]
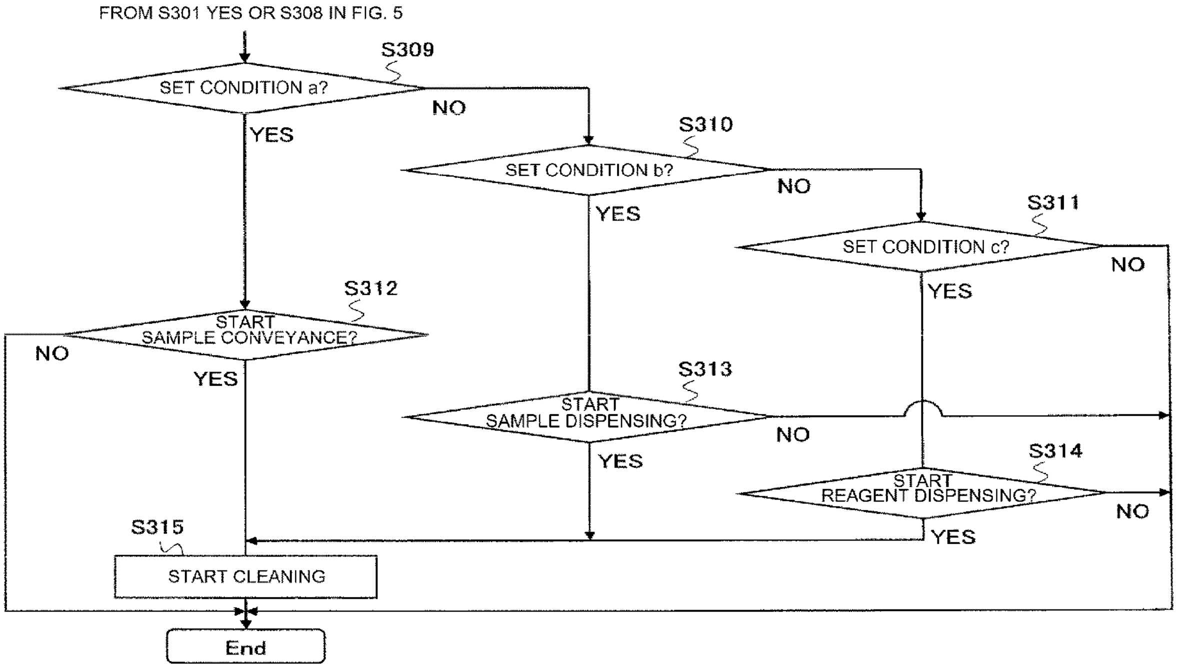

[FIG. 7]
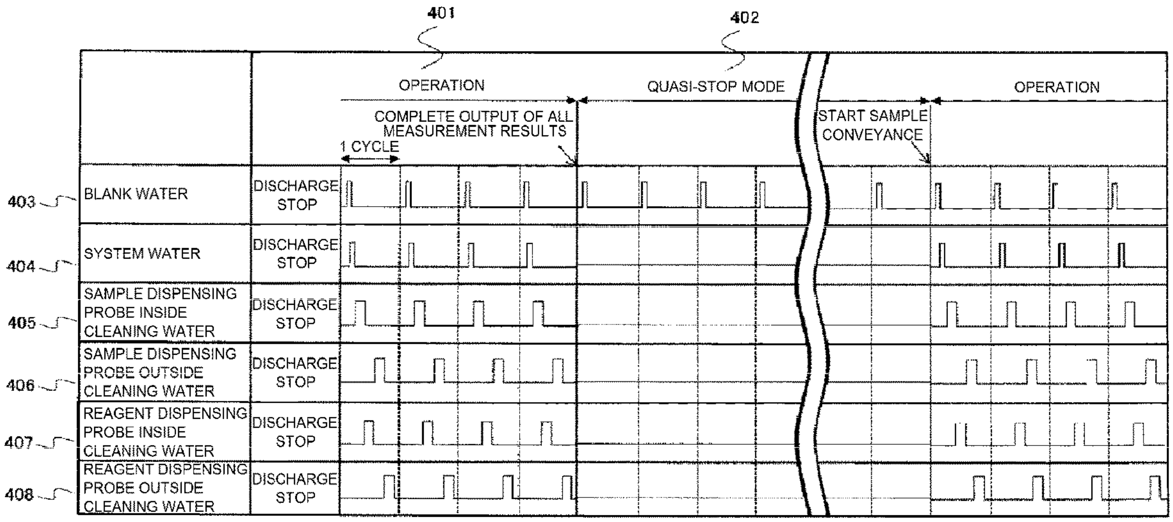

[FIG. 8]
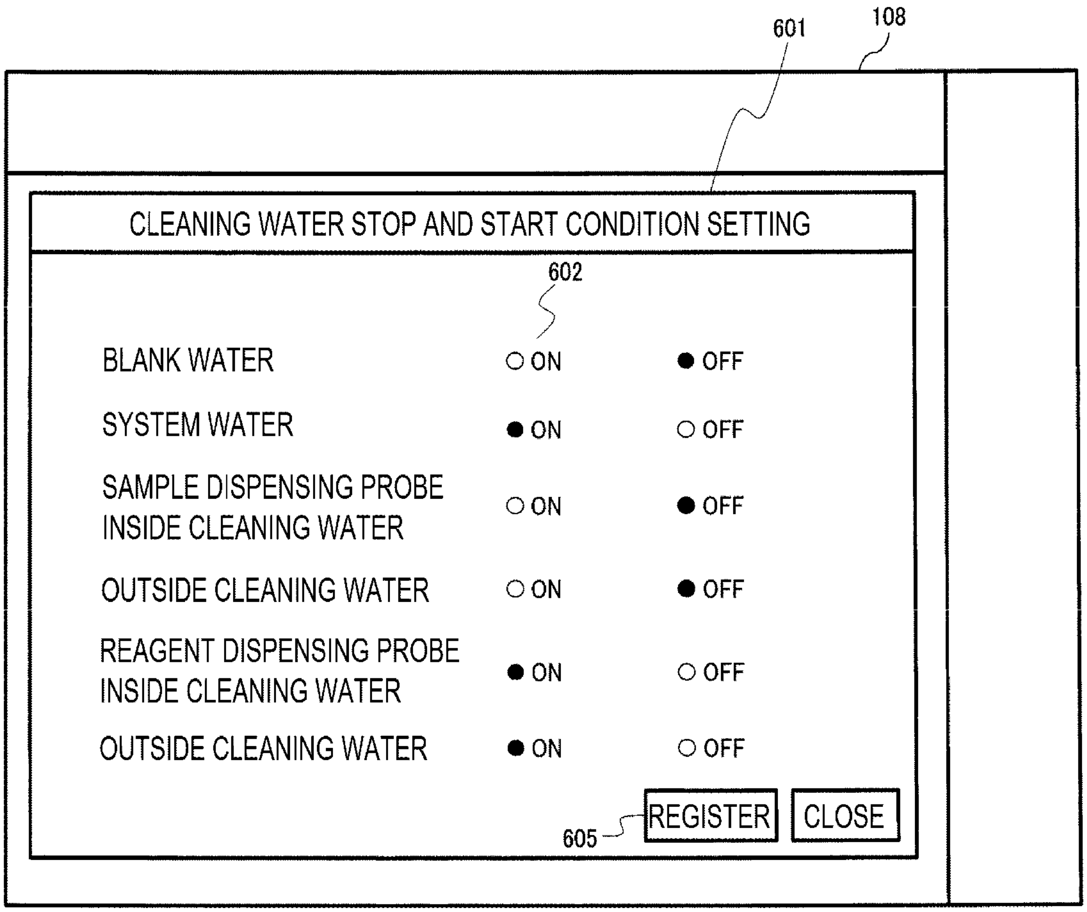

[FIG. 9]
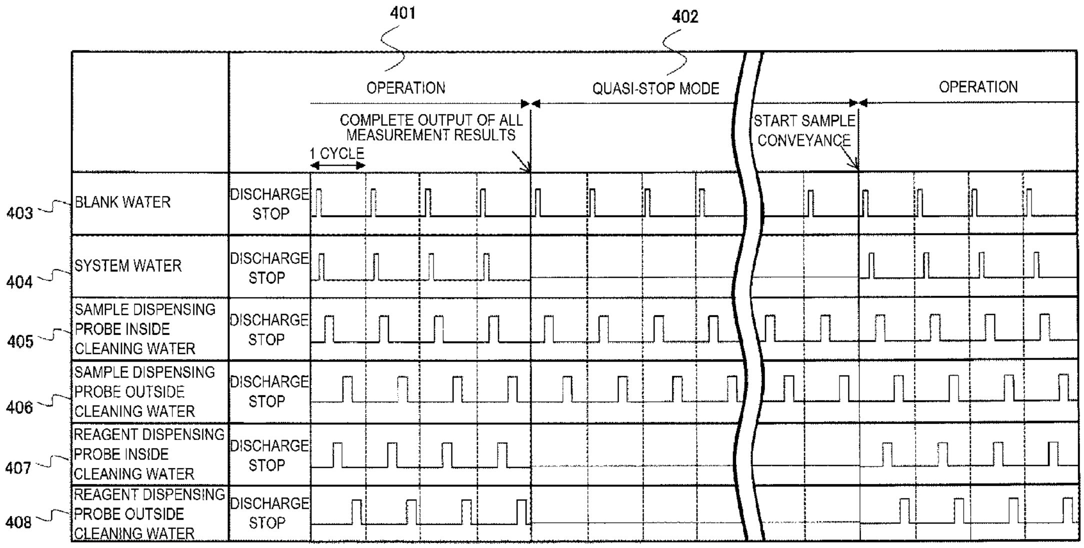

[FIG. 10]
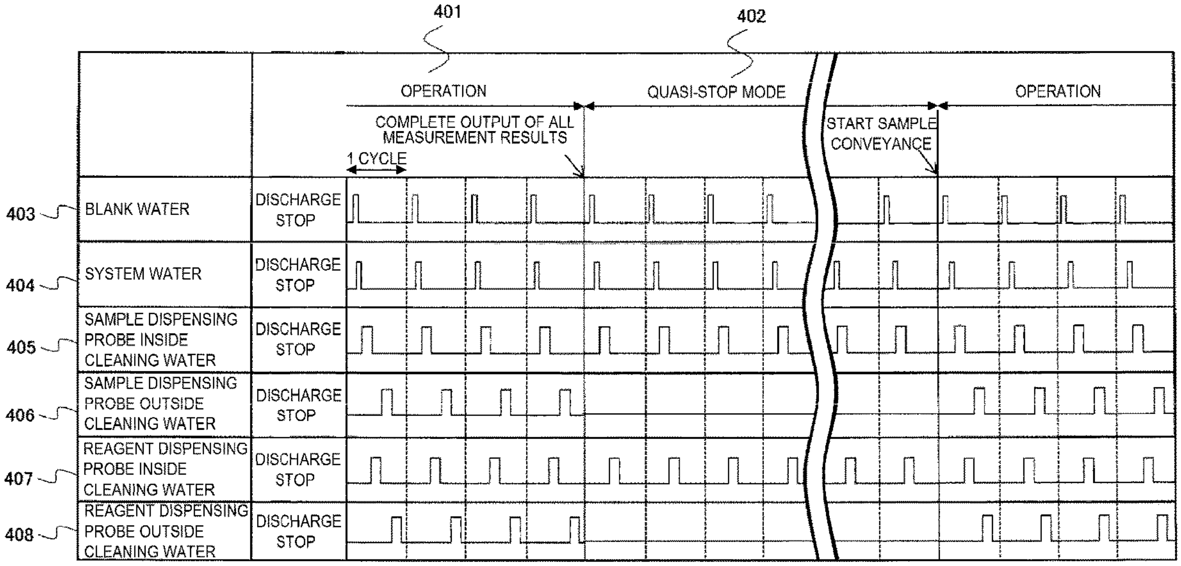

[FIG. 11]
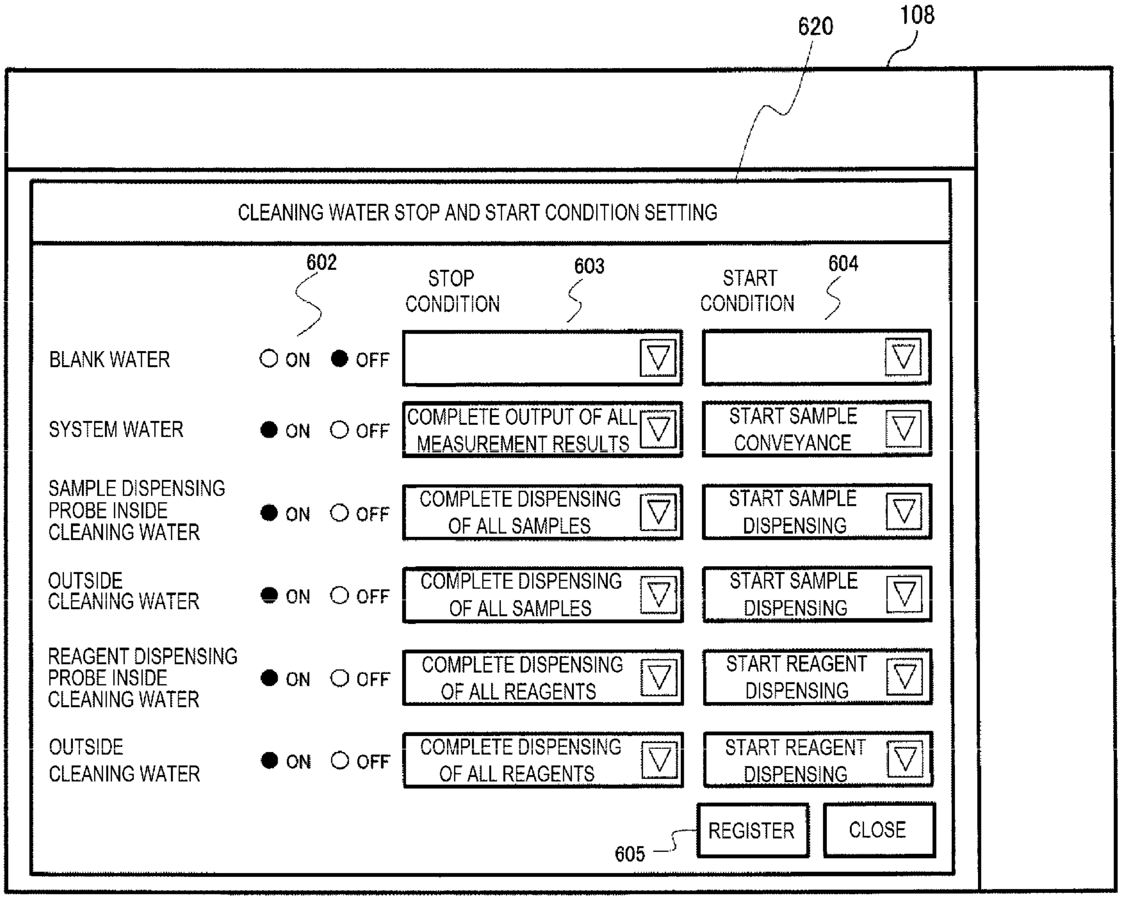

[FIG. 12]
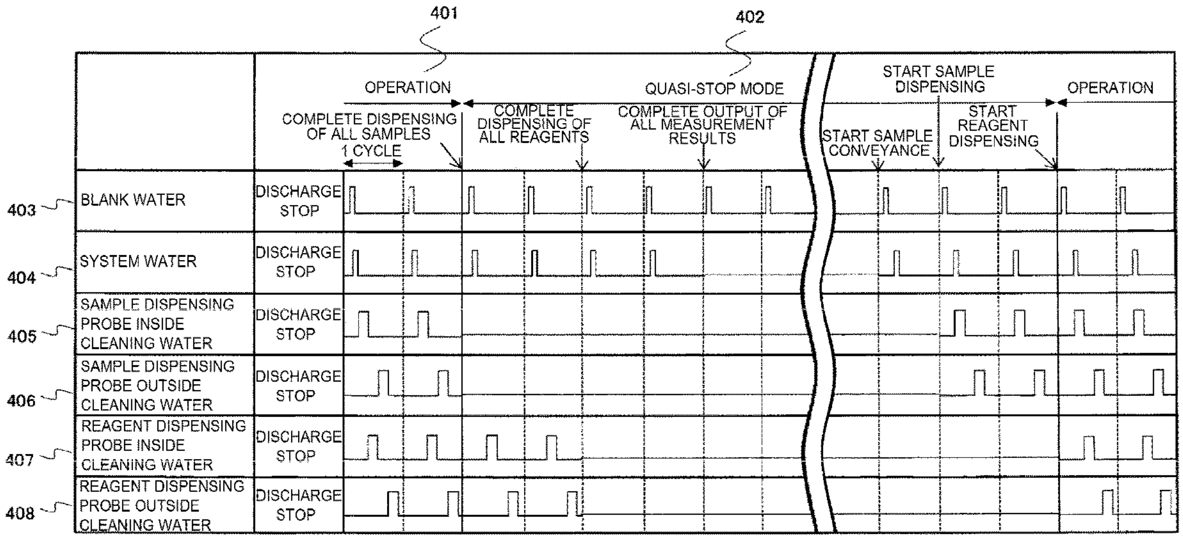

[FIG. 13]
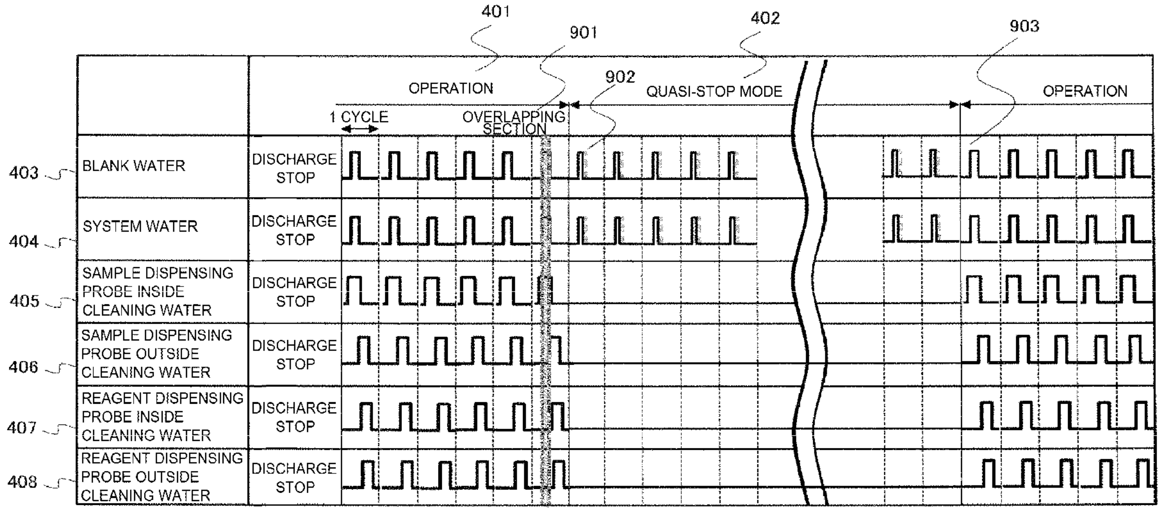

[FIG. 14]
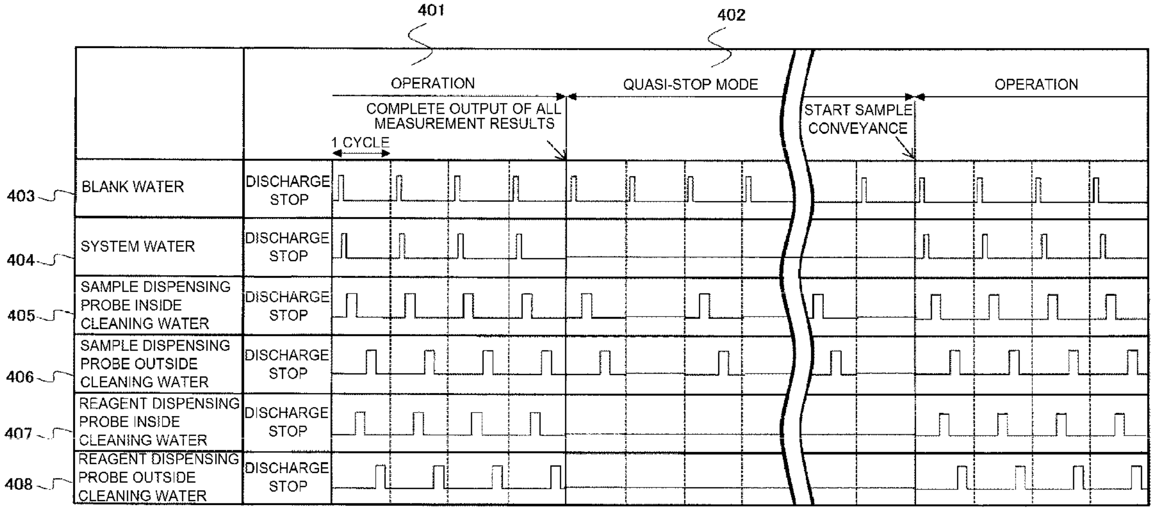

AUTOMATIC ANALYZER AND METHOD OF OPERATING AUTOMATIC ANALYZER

TECHNICAL FIELD

The present invention relates to an automatic analyzer that performs qualitative and quantitative analysis of a plurality of kinds of biological samples such as blood, urine, and spinal fluid, and a method of operating the automatic analyzer.

BACKGROUND ART

In order to reduce a standby time of a user by rapidly coping with an urgent sample and reduce a running cost due to water, power, and the like generated when measurement is not performed, PTL 1 discloses that there are two power-saving mode functions of stopping a mechanism operation such as a mode 1 in which an operation of a cleaning mechanism is stopped and in addition to the mode 1, a mode 2 in which a light source lamp is stopped, during the standby time in which measurement is not performed by an analysis module after measurement is completed.

CITATION LIST

Patent Literature

PTL 1: JP-A-2015-129659

SUMMARY OF INVENTION

Technical Problem

Automatic analyzers that automatically perform quantitative and qualitative analysis of a sample such as blood and urine have been widely used mainly in university hospitals and clinical laboratory centers in which many patient samples need to be processed in a short time.

In a sample test using such an automatic analyzer, a rapid output of a result is required, and particularly, is strongly required for an urgent sample. Meanwhile, it is impossible to predict the time when an urgent sample occurs.

Therefore, it is desired that the analyzer is operated for 24 hours and is on standby while maintaining a measurable state such that measurement can be quickly started.

In the automatic analyzer in the related art, after the measurement of a biological sample is completed, the automatic analyzer is on standby while continuing cell blank measurement in which cell blank water is contained in a reaction vessel and an absorbance of the reaction vessel is measured with light having an analytical wavelength to confirm that no abnormality occurs in the reaction vessel, and a cleaning operation for preventing a cell or a probe from drying out, so that the measurement can be quickly performed when a measurement request of a sample is received.

However, when the cell blank measurement and the cleaning operation are continued, a detergent and cleaning water are continuously consumed, and therefore, the longer the standby state is, the larger a consumption amount thereof is.

With regard to such a technique for reducing consumption of water and detergent, PTL 1 described above discloses a technique including a mode for stopping energization of a reaction disk or the cleaning mechanism.

Although in the configuration described in PTL 1, waste of power, detergent, and water is reduced, there are problems that it is necessary to perform the cell blank measurement until measurement can be performed from the standby state of the mode, and it takes time until the measurement can be performed.

As described above, there is a trade-off relation that in order to realize rapid measurement start, the detergent and water are wasted, whereas in order to save the detergent and water, the measurement rapid start is inhibited.

The invention has been made in view of the above problem, and an object of the invention is to provide an automatic analyzer that satisfies both rapid measurement start and water consumption reduction, and a method of operating the automatic analyzer.

Solution to Problem

The invention includes a plurality of means for solving the above problems, and an example thereof is an automatic analyzer that performs qualitative and quantitative analysis of a liquid obtained by reaction of a sample and a reagent, the automatic analyzer including: a reaction disk that includes a plurality of reaction vessels for reaction of the sample with the reagent; a sample dispensing probe that dispenses the sample to the reaction vessels on the reaction disk; a sample dispensing probe cleaning tank that cleans an outer periphery of the sample dispensing probe after the sample is dispensed; a reagent dispensing probe that dispenses the reagent to the reaction vessels on the reaction disk; a reagent dispensing probe cleaning tank that cleans an outer periphery of the reagent dispensing probe after the reagent is dispensed; a cleaning mechanism that cleans the reaction vessels after measurement is completed; a water supply mechanism that supplies cleaning water to the sample dispensing probe, the sample dispensing probe cleaning tank, the reagent dispensing probe, the reagent dispensing probe cleaning tank and the cleaning mechanism; a control unit that, when the sample is not analyzed by the automatic analyzer and is in a standby state where the measurement of the sample is acceptable, executes a quasi-stop mode in which supply of the cleaning water supplied by the water supply mechanism is not completely stopped and a supply amount is controlled to be smaller than a supply amount during the measurement of the sample; and a third setting unit that selects whether to execute the quasi-stop mode. The quasi-stop mode is a mode in which supply of the cleaning water to at least one of the sample dispensing probe, the sample dispensing probe cleaning tank, the reagent dispensing probe, the reagent dispensing probe cleaning tank and the cleaning mechanism is stopped, and supply of the cleaning water to one or more of the above is continued.

Advantageous Effect

According to the invention, both rapid measurement start and water consumption reduction can be satisfied. Problems, configurations, and effects other than those described above will be clarified with the following description of embodiments.

BRIEF DESCRIPTION OF DRAWINGS

FIG. 1 is a diagram showing an outline of a system configuration of an automatic analyzer according to a first embodiment of the invention.

FIG. 2 is a diagram showing functional blocks of a control unit of an analysis module that performs a quasi-stop mode and a cleaning water discharge control in the automatic analyzer according to the first embodiment.

FIG. 3 is a diagram showing an example of a stop condition and a start condition in the automatic analyzer according to the first embodiment.

FIG. 4 is a diagram showing an example of a screen for setting whether a quasi-stop mode is executed in the automatic analyzer according to the first embodiment.

FIG. 5 is a flowchart showing an example of a flow for controlling stop and start of cleaning water based on the stop condition and the start condition shown in FIG. 3 in the automatic analyzer according to the first embodiment.

FIG. 6 is a continuation of the flowchart shown in FIG. 5.

FIG. 7 is a time chart of the cleaning water in the automatic analyzer according to the first embodiment.

FIG. 8 is a diagram showing an example of a screen for setting stop and start conditions of cleaning water in an automatic analyzer according to a second embodiment of the invention.

FIG. 9 is a time chart of the cleaning water in the automatic analyzer according to the second embodiment.

FIG. 10 is another example of a time chart of the cleaning water in the automatic analyzer according to the second embodiment.

FIG. 11 is a diagram showing an example of a screen for setting stop and start conditions of cleaning water in an automatic analyzer according to a third embodiment of the invention.

FIG. 12 is a time chart of the cleaning water in the automatic analyzer according to the third embodiment.

FIG. 13 is a time chart of cleaning water in an automatic analyzer according to a fourth embodiment of the invention.

FIG. 14 is a time chart of cleaning water in an automatic analyzer according to a fifth embodiment of the invention.

DESCRIPTION OF EMBODIMENTS

Hereinafter, embodiments of an automatic analyzer and a method of operating the automatic analyzer according to the invention will be described with reference to the drawings.

First Embodiment

A first embodiment of an automatic analyzer and a method of operating the automatic analyzer according to the invention will be described with reference to FIGS. 1 to 7.

An overall configuration of an automatic analysis system according to the first embodiment will be described with reference to FIG. 1. FIG. 1 is a diagram schematically showing an overall configuration of an automatic analysis system according to an embodiment of the invention.

An automatic analyzer (100) shown in FIG. 1 is an apparatus for performing qualitative and quantitative analysis of a sample such as blood or urine, and mainly includes a conveyance module (101), an analysis module (111), and an operation module (121).

The conveyance module (101) is a module for loading and collecting a sample rack (104), on which one or more sample vessels containing samples to be analyzed are placed, into the automatic analyzer (100) and conveying the sample rack (104) to the analysis module (111).

The conveyance module (101) includes a rack buffer (103), a rack supply tray (102), a rack storage tray (106), and a conveyance line (105).

In the conveyance module (101), the sample rack (104) provided on the rack supply tray (102) is conveyed to the rack buffer (103) by the conveyance line (105). A sample presence and absence determination sensor (not shown) is provided in a middle of the conveyance line (105) to recognize presence or absence of a sample vessel on the sample rack (104). When it is determined that a sample vessel is present, a sample barcode reader (not shown) reads a sample barcode (not shown) attached to the sample vessel and recognizes identification information of the sample. In an actual system, the identification information is used to identify a patient.

The rack buffer (103) has a rotor structure that performs a circular motion, and has a slot, on an outer circumference, for radially holding a plurality of sample racks (104) on which a plurality of sample vessels are placed. The slot is rotated by a motor, so that any sample rack (104) is carried in/out to/from a request destination. With such a structure, it is not always necessary to process the sample racks (104) that are previously placed in order. That is, the sample rack having a high priority can be processed first.

The conveyance line (105) is connected to a point on a radial circumference of the rack buffer (103) to carry in and out the sample rack (104). Assuming that this point is a position of 0 degree on the circumference, a sample dispensing line (112) for drawing the sample rack (104) into the analysis module (111) described later is connected at a position of 90 degrees on the circumference with respect to the position where the conveyance line (105) is connected to carry in and out the sample rack (104).

The sample rack (104) for which dispensing is completed in the analysis module (111) may be on standby for an output of a measurement result in the rack buffer (103), and may be subjected to a process such as automatic retest as necessary. Further, when the process is completed, the sample rack (104) is conveyed to the rack storage tray (106) via the conveyance line (105).

The analysis module (111) is a module that performs a measurement operation of a measurement item requested for a sample and outputs the measurement result, and is connected to the conveyance module (101).

The analysis module (111) includes a reaction disk (115), a reagent disk (117), the sample dispensing line (112), a sample dispensing probe (113), a sample dispensing probe cleaning tank (113A), a reagent dispensing probe (116), a reagent dispensing probe cleaning tank (116A), a cleaning mechanism (115A), a cleaning water tank (120A), a syringe pump (120B), a cleaning water supply pipe (120C), a biochemical measurement unit (118), an electrolyte measurement unit (114), and a control unit (122).

Reaction vessels (not shown) are arranged on a circumference of the reaction disk (115). The sample dispensing line (112) with which the sample rack (104) with a sample vessel placed thereon is carried is provided near the reaction disk (115).

The sample dispensing probe (113) capable of rotating and moving up and down is provided between the reaction disk (115) and the sample dispensing line (112). The sample dispensing probe (113) moves while drawing an arc around a rotation axis, and dispenses the sample from the sample rack (104) to the reaction vessel.

After the sample is dispensed, the sample dispensing probe (113) is inside cleaned with cleaning water supplied from the cleaning water tank (120A), and is outside cleaned with cleaning water supplied from the cleaning water tank (120A) in the sample dispensing probe cleaning tank (113A).

The reagent disk (117) is a storage in which a plurality of reagent bottles (not shown) containing reagents therein can be placed on a circumference. The reagent disk (117) is kept cold.

The reagent dispensing probe (116) capable of rotating and moving up and down is provided between the reaction disk (115) and the reagent disk (117). The reagent dispensing probe (116) moves while drawing an arc around a rotation axis, accesses the reagent disk (117) from a reagent dispensing probe aspiration port, and dispenses the reagent from the reagent bottle to the reaction vessel.

After the reagent is dispensed, the reagent dispensing probe (116) is inside cleaned with cleaning water supplied from the cleaning water tank (120A), and is outside cleaned with cleaning water supplied from the cleaning water tank (120A) in the reagent dispensing probe cleaning tank (116A).

The sample dispensing probe cleaning tank (113A) is provided within an operation range of the sample dispensing probe (113), and cleans an outer periphery of the sample dispensing probe (113). The reagent dispensing probe cleaning tank (116A) is provided within the operation range of the reagent dispensing probe (116), and cleans an outer periphery of the reagent dispensing probe (116).

The cleaning mechanism (115A) aspirates a reaction solution in the reaction vessel held on the reaction disk (115) for which measurement is completed, and in preparation for a next analysis, cleans an inside of the reaction vessel with the cleaning water supplied from the cleaning water tank (120A). Further, in a standby state where no analysis is performed, blank water for cell blank measurement is supplied as necessary.

The cleaning water tank (120A) is a tank that stores cleaning water to be supplied to the sample dispensing probe (113), the sample dispensing probe cleaning tank (113A), the reagent dispensing probe (116), the reagent dispensing probe cleaning tank (116A) and the cleaning mechanism (115A), and is supplied with cleaning water via the syringe pump (120B) and the cleaning water supply pipe (120C).

The electrolyte measurement unit (114) and the biochemical measurement unit (118) are further arranged around the reaction disk (115).

The control unit (122) arranged in the analysis module (111) is connected to each mechanism in the analysis module (111) described above, and controls an operation thereof.

In particular, when the sample is not analyzed by the automatic analyzer (100) and is in the standby state where the measurement of the sample is acceptable, the control unit (122) of the present embodiment executes a quasi-stop mode in which a supply amount of the cleaning water supplied by the cleaning water tank (120A) and the syringe pump (120B) is controlled to be smaller than a supply amount during the measurement of the sample. Details of the quasi-stop mode will be described later with reference to FIG. 2 and the subsequent drawings.

The operation module (121) includes a user interface such as a display unit (108) for displaying an operation screen for ordering measurement items to be measured for a sample to be measured and an operation screen for confirming a measurement result, and an input unit (107) such as a keyboard, a mouse, and a touch panel for inputting various instructions, and is a part that plays a role of controlling information of the modules of the entire automatic analyzer (100).

The operation module (121) is connected to the control unit (122) provided in the analysis module (111) and a control unit (not shown) provided in the conveyance module (101) via a wired or wireless network line, transmits a command to control the operation of the mechanisms in the analysis module (111) and the operation of the mechanisms in the conveyance module (101), receives data related to measurement from the control unit (122), and displays the data on the display unit (108).

Regarding the analysis module (111) in FIG. 1, a configuration in which measurement units for biochemical items and electrolyte items are integrated into one analysis module is described as an example. However, the configuration of the module is not limited thereto, and may be the biochemical measurement unit (118) alone or the electrolyte measurement unit (114) alone, or a module for immunoassay. Further, a measurement unit for blood coagulation analysis or the like may be appropriately provided according to a use environment. Furthermore, the conveyance module may be omitted.

In addition, although a case in which one analysis module is provided has been described, two or more analysis modules may be provided. In this case, the analysis module is not particularly limited, and may include a necessary analysis unit according to the use environment.

Next, an outline of mechanical operations of the automatic analyzer (100) shown in FIG. 1 will be described.

The conveyance module (101) carries out the sample rack (104) provided on the rack supply tray (102) of the automatic analyzer (100) on the conveyance line (105) one rack at a time, and carries the sample rack (104) into the rack buffer (103). The sample rack (104) conveyed to the rack buffer (103) is conveyed to the sample dispensing line (112) of the analysis module (111).

When the sample rack (104) arrives at the sample dispensing line (112) of the analysis module (111), the sample dispensing probe (113) performs a dispensing operation on each sample placed on the sample rack (104) in accordance with the measurement item requested by the operation module (121).

Here, when the measurement item is a biochemical item, the sample dispensing probe (113) discharges an aspirated sample to the reaction vessel on the reaction disk (115), a reagent aspirated from the reagent disk (117) by the reagent dispensing probe (116) is further added to the reaction vessel, followed by stirring. Thereafter, optical characteristics are measured by the biochemical measurement unit (118), and the measurement result is transmitted to the operation module (121).

In addition, when the requested measurement item is an electrolyte item, the sample dispensing probe (113) discharges the aspirated sample onto the electrolyte measurement unit (114), an electromotive force is measured by the electrolyte measurement unit (114), and the measurement result is transmitted to the operation module (121).

The operation module (121) determines a concentration of a specific component in the sample by arithmetic processing based on the transmitted measurement result.

Next, details of the quasi-stop mode and cleaning water discharge control in the automatic analyzer (100) according to the present embodiment will be described with reference to FIGS. 2 to 7.

FIG. 2 shows an example of a functional block diagram of the control unit of the analysis module (111) that executes the quasi-stop mode and the cleaning water discharge control. FIG. 3 shows an example of a stop condition and a start condition. FIG. 4 shows an example of a screen for selecting whether the quasi-stop mode is executed. FIGS. 5 and 6 show flowcharts for controlling stop and start of the cleaning water based on the stop condition and the start condition. FIG. 7 shows a time chart of the cleaning water when the flowcharts are executed.

The control unit (122) of the present embodiment includes, as functional blocks related to the quasi-stop mode, a quasi-stop mode setting memory (501), a quasi-stop mode condition table (502), a quasi-stop mode operation determination unit (503), and a measurement status management unit (504) that manages a measurement status of the apparatus. Further, the control unit (122) includes, as functional blocks for controlling the cleaning water, a reaction vessel cleaning control unit (505), a sample dispensing probe control unit (506), and a reagent dispensing probe control unit (507).

The quasi-stop mode setting memory (501) sets whether to execute the quasi-stop mode. Whether to execute the quasi-stop mode is set, as shown in FIG. 4, depending on whether a Yes button (611) or a No button (612) is selected in a quasi-stop mode execution selection screen (610) for selecting whether the quasi-stop mode is executed, which is displayed on the display unit (108).

The quasi-stop mode condition table (502) stores setting conditions of the stop condition and the start condition of the cleaning water shown in FIG. 3. In the present embodiment, the stop condition includes four conditions of (A) complete dispensing of all samples, (B) complete dispensing of all reagents, (C) complete output of all measurement results, and (D) no stop, and the start condition includes three conditions of (a) start sample conveyance, (b) start sample dispensing, and (c) start reagent dispensing.

The quasi-stop mode operation determination unit (503) determines, with reference to the quasi-stop mode setting memory (501), the quasi-stop mode condition table (502), and the measurement state management unit (504), a necessity of stopping and starting the cleaning water, and outputs a determination result to the reaction vessel cleaning control unit (505), the sample dispensing probe control unit (506), and the reagent dispensing probe control unit (507).

The reaction vessel cleaning control unit (505) controls the discharge of the blank water for cell blank measurement and system water for cleaning the reaction vessel in response to determination by the quasi-stop mode operation determination unit (503). The sample dispensing probe control unit (506) controls the discharge of inside cleaning water and outside cleaning water of the sample dispensing probe (113) in response to the determination by the quasi-stop mode operation determination unit (503). The reagent dispensing probe control unit (507) controls the discharge of inside cleaning water and outside cleaning water of the reagent dispensing probe (116) in response to the determination by the quasi-stop mode operation determination unit (503).

In the invention, when the quasi-stop mode is set, an operation (401) state is transitioned to the quasi-stop mode, supply of the cleaning water to at least one of the sample dispensing probe (113), the sample dispensing probe cleaning tank (113A), the reagent dispensing probe (116), the reagent dispensing probe cleaning tank (116A) and the cleaning mechanism (115A) is stopped, and measurement start is on standby. At this time, the supply to one or more of the above is continued without being stopped.

Presence or absence of the supply of the cleaning water does not need to be fixed at all locations, and can be set individually. Individual setting will be described in a second embodiment.

In addition, the stop condition and the start condition can also be individually set for supply destinations of the cleaning water of which the supply is set to be stopped. This configuration will be described in a third embodiment.

Next, a determination flow in the quasi-stop mode operation determination unit (503) of the control unit (122) will be described with reference to FIGS. 5 and 6.

The quasi-stop mode operation determination unit (503) executes the flowcharts in FIGS. 5 and 6 every time corresponding to one analysis cycle.

As shown in FIG. 5, the quasi-stop mode operation determination unit (503) determines whether cleaning is stopped in order to determine whether to be in a quasi-stop mode (402) state (step S301). When it is determined that the cleaning is stopped, the process proceeds to step S309 shown in FIG. 6, and when it is determined that the cleaning is not stopped, the process proceeds to step S302.

A criterion for determining whether to be in the quasi-stop mode (402) state is not particularly limited thereto, and may be other criteria.

Next, in order to determine which of the conditions (A), (B), and (C) shown in FIG. 3 is a condition for stopping the cleaning, the quasi-stop mode operation determination unit (503) determines whether the condition (A) is set (step S302). When it is determined that the condition (A) is set, the process proceeds to step S305, and when it is determined that the condition (A) is not set, the process proceeds to step S303.

Next, the quasi-stop mode operation determination unit (503) determines whether the condition (B) is set (step S303). When it is determined that the condition (B) is set, the process proceeds to step S306, and when it is determined that the condition (B) is not set, the process proceeds to step S304.

Next, the quasi-stop mode operation determination unit (503) determines whether the condition (C) is set (step S304). When it is determined that the condition (C) is set, the process proceeds to step S307, and when it is determined that the condition (C) is not set, the process is completed.

When it is determined in step S302 that the condition (A) is set, the quasi-stop mode operation determination unit (503) determines whether dispensing of all the samples is completed (step S305). When it is determined that the dispensing of all the samples is completed, the process proceeds to step S308, and when it is determined that the dispensing of all the samples is not completed, the process is completed.

When it is determined in step S303 that the condition (B) is set, the quasi-stop mode operation determination unit (503) determines whether dispensing of all the reagents is completed (step S306). When it is determined that the dispensing of all the reagents is completed, the process proceeds to step S308, and when it is determined that the dispensing of all the reagents is not completed, the process is completed.

When it is determined in step S304 that the condition (C) is set, the quasi-stop mode operation determination unit (503) determines whether an output of all the measurement results is completed (step S307). When it is determined that the output of all the measurement results is completed, the process proceeds to step S308, and when it is determined that the output of all the measurement results is not completed, the process is completed.

When it is determined in step S305 that the dispensing of all the samples is completed, when it is determined in step S306 that the dispensing of all the reagents is completed, or when it is determined in step S307 that the output of all the measurement results is completed, the quasi-stop mode operation determination unit (503) stops the cleaning by stopping the supply of the cleaning water to the supply destination to which the supply is to be stopped (step S308), and the process proceeds to step S309 shown in FIG. 6. At this time, as described above, the supply of the cleaning water to the supply destination to which the supply is not to be stopped is continued.

When it is determined in step S301 that the cleaning is stopped or when step S308 is completed, as shown in FIG. 6, the quasi-stop mode operation determination unit (503) determines whether the condition (a) is set (step S309) in order to determine which of the conditions (a), (b), and (b) shown in FIG. 3 is a condition for starting the cleaning. When it is determined that the condition (a) is set, the process proceeds to step S312, and when it is determined that the condition (a) is not set, the process proceeds to step S310.

Next, the quasi-stop mode operation determination unit (503) determines whether the condition (b) is set (step S310). When it is determined that the condition (b) is set, the process proceeds to step S313, and when it is determined that the condition (b) is not set, the process proceeds to step S311.

Next, the quasi-stop mode operation determination unit (503) determines whether the condition (c) is set (step S311). When it is determined that the condition (c) is set, the process proceeds to step S314, and when it is determined that the condition (c) is not set, the process is completed.

When it is determined in step S309 that the condition (a) is set, the quasi-stop mode operation determination unit (503) determines whether conveyance of the sample is started (step S312). When it is determined that the conveyance of the sample is started, the process proceeds to step S315, and when it is determined that the conveyance of the sample is not started, the process is completed.

When it is determined in step S310 that the condition (b) is set, the quasi-stop mode operation determination unit (503) determines whether the dispensing of the sample is started (step S313). When it is determined that the dispensing of the sample is started, the process proceeds to step S315, and when it is determined that the dispensing of the sample is not started, the process is completed.

When it is determined in step S311 that the condition (c) is set, the quasi-stop mode operation determination unit (503) determines whether the dispensing of the reagent is started (step S314). When it is determined that the dispensing of the reagent is started, the process proceeds to step S315, and when it is determined that the dispensing of the reagent is not started, the process is completed.

When it is determined in step S312 that the conveyance of the sample is started, when it is determined in step S313 that the dispensing of the sample is started, or when it is determined in step S314 that the dispensing of the reagent is started, the quasi-stop mode operation determination unit (503) starts the cleaning by supplying the cleaning water to the supply destination to which the supply is to be stopped (step S315), and the process is completed.

In such an automatic analyzer (100), a time chart in a case in which system water (404) for cleaning the cleaning mechanism (115A), sample dispensing probe inside cleaning water (405) for inside cleaning the sample dispensing probe (113), sample dispensing probe outside cleaning water (406) for outside cleaning the sample dispensing probe (113) in the sample dispensing probe cleaning tank (113A), reagent dispensing probe inside cleaning water (407) for inside cleaning the reagent dispensing probe (116), reagent dispensing probe outside cleaning water (408) for outside cleaning the reagent dispensing probe (116) in the sample dispensing probe cleaning tank (113A) are set as the supply destinations to which the supply of the cleaning water is to be stopped, the condition (C) is set as the cleaning stop condition, and the condition (a) is set as the cleaning start condition will be described with reference to FIG. 7.

In such a case, in the operation (401) state where the measurement is performed, the process proceeds in steps S301→S302→S303→S304→S307, and the quasi-stop mode operation determination unit (503) confirms whether the output of all the measurement results is completed. When the output of the measurement results is not completed, as shown in FIG. 7, the supply of the cleaning water is on standby without being stopped (NO in step S307), and the flowcharts in FIGS. 5 and 6 are executed again in a next cycle.

Therefore, blank water (403) for cell blank measurement and the system water (404) for cleaning are supplied to the reaction vessel on the reaction disk (115). Further, the sample dispensing probe inside cleaning water (405) and the sample dispensing probe outside cleaning water (406) are supplied to the sample dispensing probe (113), and the reagent dispensing probe inside cleaning water (407) and the reagent dispensing probe outside cleaning water (408) are supplied to the reagent dispensing probe (116) to repeat the cleaning.

In contrast, when the output of all the measurement results is completed, the operation (401) state is transitioned to the quasi-stop mode (402).

In the quasi-stop mode (402) in which the measurement is not performed, as shown in FIG. 7, the supply of the blank water (403) is continued. Meanwhile, the supply of the system water (404), the sample dispensing probe inside cleaning water (405), the sample dispensing probe outside cleaning water (406), the reagent dispensing probe inside cleaning water (407), and the reagent dispensing probe outside cleaning water (408) is stopped.

Thereafter, since the condition (a) is set in the present embodiment, the quasi-stop mode operation determination unit (503) confirms whether the conveyance of the sample is started (step S312). When the conveyance of the sample is started, the supply of the system water (404), the sample dispensing probe inside cleaning water (405), the sample dispensing probe outside cleaning water (406), the reagent dispensing probe inside cleaning water (407), and the reagent dispensing probe outside cleaning water (408), that is, the cleaning is started, and the quasi-stop mode (402) is transitioned to the operation (401) state.

Next, effects of the present embodiment will be described.

In the automatic analyzer (100) according to the first embodiment of the invention described above, when the sample is not analyzed and is in the standby state where the measurement of the sample is acceptable, by executing the quasi-stop mode in which the supply amount of the cleaning water supplied by the cleaning water tank (120A) and the syringe pump (120B) is controlled to be smaller than the supply amount during the measurement of the sample, it is possible to solve a contradictory problem that a state where the measurement can be quickly started can be maintained by continuing an operation necessary for the measurement start and consumption of water can be reduced to a necessary minimum.

For example, in a case of FIG. 7 described above, by continuing the supply of the blank water (403) to the reaction vessel, it is possible to perform the cell blank measurement for confirming that no abnormality occurs in the cell, and thus it is possible to quickly start a next measurement after the transition from the quasi-stop mode (402) to the operation (401) state.

In addition, in the quasi-stop mode (402), by stopping the supply of the system water (404), the sample dispensing probe inside cleaning water (405), the sample dispensing probe outside cleaning water (406), the reagent dispensing probe inside cleaning water (407), and the reagent dispensing probe outside cleaning water (408), as compared with a case in the related art in which the cleaning water is continuously discharged although cleaning is not necessary, the consumption amount of water can be reduced to a minimum necessary amount.

Further, in the quasi-stop mode, the supply of the cleaning water to at least one of the sample dispensing probe (113), the sample dispensing probe cleaning tank (113A), the reagent dispensing probe (116), the reagent dispensing probe cleaning tank (116A) and the cleaning mechanism (115A) is stopped and the supply to at least one of the sample dispensing probe (113), the sample dispensing probe cleaning tank (113A), the reagent dispensing probe (116), the reagent dispensing probe cleaning tank (116A) and the cleaning mechanism (115A) is continued, and therefore, it is possible to reliably reduce the consumption amount of the cleaning water by stopping the supply of the cleaning water to a place where the consumption amount of the cleaning water is large.

Furthermore, by further providing the quasi-stop mode execution selection screen (610) for selecting whether the quasi-stop mode is executed, it is possible to switch between a case in which it is desired to reduce the consumption amount of the cleaning water and a case in which it is more important to quickly restart the measurement than to reduce the consumption amount, and it is possible to ensure convenience for a user.

Second Embodiment

An automatic analyzer and a method of operating the automatic analyzer according to the second embodiment of the invention will be described with reference to FIGS. 8 to 10. FIG. 8 is a diagram showing an example of a screen for setting stop and start conditions of cleaning water in the automatic analyzer according to the second embodiment of the invention. FIGS. 9 and 10 are examples of time charts of the cleaning water in the automatic analyzer according to the second embodiment.

In the present embodiment, the same components as those of the first embodiment are denoted by the same reference numerals, and the description thereof will be omitted. The same applies to the following embodiments.

In the first embodiment described above, a supply destination to which the supply of the cleaning water is to be stopped in the quasi-stop mode is fixed to the quasi-stop mode condition table (502) in the apparatus, whereas in the present embodiment, for example, a screen for selecting whether the supply of the cleaning water is stopped for each supply destination is displayed on the display unit (108) of the operation module (121), and can be selected by a user.

In the present embodiment, as shown in FIG. 8, a cleaning water stop and start condition setting screen (601) for individually setting whether to supply cleaning water to the sample dispensing probe (113), the sample dispensing probe cleaning tank (113A), the reagent dispensing probe (116), the reagent dispensing probe cleaning tank (116A) and the cleaning mechanism (115A) in the quasi-stop mode is displayed on the display unit (108), and can be appropriately selected by the user using the input unit (107).

For example, when the quasi-stop mode (402) is continued for a long period of time and in a case in which water supply is stopped, the sample dispensing probe (113) may dry and affect the next measurement.

In such a case, as shown in FIG. 8, the blank water (403), the sample dispensing probe inside cleaning water (405), and the sample dispensing probe outside cleaning water (406) are selected to be not set (supply continued). Meanwhile, the system water (404), the sample dispensing probe inside cleaning water (405), the sample dispensing probe outside cleaning water (406), the reagent dispensing probe inside cleaning water (407), and the reagent dispensing probe outside cleaning water (408) are selected to be set (supply stopped). Thereafter, by selecting a setting registration button (605), the setting is reflected on the apparatus.

Next, FIG. 9 shows a time chart of the cleaning water in a case in which the stop condition is (C) complete output of all measurement results and the start condition is (a) start sample conveyance.

When the output of all the measurement results is completed in the operation (401) state, the cleaning with the system water (404), the reagent dispensing probe inside cleaning water (407), and the reagent dispensing probe outside cleaning water (408) for which the condition (C) is set is stopped, and the operation (401) state is transitioned to the quasi-stop mode (402).

Meanwhile, in the quasi-stop mode (402), supply of the blank water (403), the sample dispensing probe inside cleaning water (405), and the sample dispensing probe outside cleaning water (406) is continued based on the setting on the screen shown in FIG. 8.

Thereafter, since the condition (a) is set, when measurement is started and conveyance of a sample is started, cleaning with the system water (404), the reagent dispensing probe inside cleaning water (407), and the reagent dispensing probe outside cleaning water (408) is started, and the quasi-stop mode (402) is transitioned to the operation (401) state.

In addition, since an amount of the outside cleaning water is 10 times or more an amount of the inside cleaning water in one discharge, the discharge of the sample dispensing probe outside cleaning water (406) and the reagent dispensing probe outside cleaning water (408) can be set to be stopped while continuing the discharge of the sample dispensing probe inside cleaning water (405) and the reagent dispensing probe inside cleaning water (407) in the quasi-stop mode as shown in FIG. 10.

Other configurations and operations are substantially the same as those of the automatic analyzer and the method of operating the automatic analyzer according to the first embodiment described above, and detailed descriptions thereof will be omitted.

Also in the automatic analyzer and the method of operating the automatic analyzer according to the second embodiment of the invention, substantially the same effects as those of the automatic analyzer and the method of operating the automatic analyzer according to the first embodiment described above can be exerted.

In addition, since a necessity of cleaning water varies depending on characteristics of the mechanism on standby for the next measurement, by further including the cleaning water stop and start condition setting screen (601) for individually setting whether the cleaning water is supplied to the sample dispensing probe (113), the sample dispensing probe cleaning tank (113A), the reagent dispensing probe (116), the reagent dispensing probe cleaning tank (116A) and the cleaning mechanism (115A) in the quasi-stop mode, it is possible to select continuation or stop of discharge of the cleaning water, and it is possible to reliably prevent unnecessary discharge of the cleaning water.

For example, according to the setting in FIG. 8 described above, in the quasi-stop mode (402), a measurable state can be maintained by continuing discharging the blank water (403), and the drying of the sample dispensing probe (113) can be prevented by continuing discharging the sample dispensing probe inside cleaning water (405) and the sample dispensing probe outside cleaning water (406). Further, the consumption amount of the cleaning water can be reduced by stopping the system water (404), the reagent dispensing probe inside cleaning water (407), and the reagent dispensing probe outside cleaning water (408) which do not require cleaning.

Further, by setting the sample dispensing probe cleaning tank (113A) and the reagent dispensing probe cleaning tank (116A) as the targets for reducing the supply amount of the cleaning water or stopping the supply of the cleaning water, the inside of the sample dispensing probe (113) and the reagent dispensing probe (116) can be prevented from drying out by continuing cleaning, and the consumption amount of water can be reduced.

Third Embodiment

An automatic analyzer and a method of operating the automatic analyzer according to the third embodiment of the invention will be described with reference to FIGS. 11 and 12. FIG. 11 is a diagram showing an example of a screen for setting stop and start conditions of cleaning water in the automatic analyzer according to the third embodiment. FIG. 12 is a time chart of the cleaning water in the automatic analyzer according to the third embodiment.

In the second embodiment described above, the cleaning water to be stopped is simultaneously stopped and started, whereas in the present embodiment, for example, a screen for individually setting a timing to enter a standby state to transition to a quasi-stop mode and a timing to start the measurement to transition to an operation state is displayed on the display unit (108) of the operation module (121), and can be selected by a user.

That is, in the present embodiment, the timing to enter the standby state to transition to the quasi-stop mode varies depending on supply destinations of the cleaning water.

In the present embodiment, as shown in FIG. 11, a cleaning water stop and start condition setting screen 620 for individually setting the timing to enter the standby state to transition to the quasi-stop mode and a timing to start the measurement to transition to the operation state for the sample dispensing probe (113), the sample dispensing probe cleaning tank (113A), the reagent dispensing probe (116), the reagent dispensing probe cleaning tank (116A) and the cleaning mechanism (115A) is displayed on the display unit 108, and can be appropriately selected by the user by using the input unit (107).

For example, when the sample dispensing and the reagent dispensing for a last requested item by the sample dispensing probe (113) and the reagent dispensing probe (116) are completed, it is unnecessary to supply the cleaning water thereafter. In such a case, it is more effective to stop the supply of the cleaning water at the timing when the cleaning water is unnecessary than to simultaneously stop the supply of the cleaning water when all measurement results are output.

In addition, due to the configuration of the automatic analyzer, it may take time until the sample arrives at the analysis module (111) from the conveyance module (101). As in the first embodiment, even when the supply of the cleaning water is simultaneously started when the conveyance of the sample is started, it is considered that the sample dispensing probe (113) and the reagent dispensing probe (116) are actually used for the measurement after several minutes or longer from the conveyance of the sample. In such a case, it is more effective to start the supply at the timing when the cleaning water is necessary.

From the above, as shown in FIG. 11, the blank water (403) is not set, and the system water (404), the sample dispensing probe inside cleaning water (405), the sample dispensing probe outside cleaning water (406), the reagent dispensing probe inside cleaning water (407), and the reagent dispensing probe outside cleaning water (408) are set.

In addition, the stop condition of the system water (404) is (C) complete output of all measurement results, and the start condition is (a) start sample conveyance. Further, the stop condition of the sample dispensing probe inside cleaning water (405) and the sample dispensing probe outside cleaning water (406) can be set to (A), the start condition thereof can be set to (b), the stop condition of the reagent dispensing probe inside cleaning water (407) and the reagent dispensing probe outside cleaning water (408) can be set to (B), and the start condition thereof can be set to (c).

FIG. 12 shows a time chart of the cleaning water in such a setting.

As shown in FIG. 12, in the operation (401) state, when all the sample dispensing is completed, the sample dispensing probe inside cleaning water (405) and the sample dispensing probe outside cleaning water (406) for which the condition (A) is set stops the cleaning, and the operation (401) state is transitioned to the quasi-stop mode (402).

Thereafter, in the quasi-stop mode (402), when all the reagent dispensing is completed, the reagent dispensing probe inside cleaning water (407) and the reagent dispensing probe outside cleaning water (408) for which the condition (B) is set stops the cleaning.

Thereafter, when the output of all the measurement results is completed, the system water (404) for which the condition (C) is set stops the cleaning of the reaction vessel.

Thus, all the cleaning water set to stop cleaning is stopped.

Thereafter, when the measurement is started and the conveyance of the sample is started, the system water (404) for which the condition (a) is set starts the cleaning of the reaction vessel.

In addition, when the dispensing of the sample is started, the sample dispensing probe inside cleaning water (405) and the sample dispensing probe outside cleaning water (406) for which the condition (b) is set starts the cleaning.

Thereafter, when the dispensing of the reagent is started, the reagent dispensing probe inside cleaning water (407) and the reagent dispensing probe outside cleaning water (408) for which the condition (c) is set starts the cleaning, and the quasi-stop mode (402) is transitioned to the operation (401) state.

Accordingly, all the cleaning is performed again.

Other configurations and operations are substantially the same as those of the automatic analyzer and the method of operating the automatic analyzer according to the first embodiment described above, and detailed descriptions thereof will be omitted.

Also in the automatic analyzer and the method of operating the automatic analyzer according to the third embodiment of the invention, substantially the same effects as those of the automatic analyzer and the method of operating the automatic analyzer according to the first embodiment described above can be exerted.

In addition, by further including the cleaning water stop and start condition setting screen (620) for individually setting the timing to enter the standby state to transition to the quasi-stop mode and the timing to start the measurement to transition to the operation state for the sample dispensing probe (113), the sample dispensing probe cleaning tank (113A), the reagent dispensing probe (116), the reagent dispensing probe cleaning tank (116A) and the cleaning mechanism (115A), the conditions can be set to stop in order from a place where the cleaning is unnecessary, and the effect of water consumption reduction can be further enhanced. In addition, the condition for starting the cleaning can also be set, based on the same idea, to start the cleaning in order from a place where the cleaning is necessary, and the effect of water consumption reduction can be further enhanced.

Fourth Embodiment

An automatic analyzer and a method of operating the automatic analyzer according to a fourth embodiment of the invention will be described with reference to FIG. 13. FIG. 13 is a time chart of the cleaning water in the automatic analyzer according to the fourth embodiment.

In the first to third embodiments described above, the discharge timings of the respective cleaning water in one cycle do not overlap with each other, and even when the cleaning water is stopped during the quasi-stop mode, a water pressure of the other cleaning water or the like is not affected.

In contrast, for example, in a large-sized automatic analyzer or the like, the time per cycle is short in order to improve a throughput, and therefore, the discharge timings of the respective cleaning water may overlap with each other as shown in FIG. 13.

In this case, the water pressure of the cleaning water when all the cleaning water is operating during the operation and the water pressure of the cleaning water when some cleaning water is stopped after entering the quasi-stop mode are changed, and the discharge amount of the cleaning water operating during the quasi-stop mode may be affected.

In order to cope with such a case, the quasi-stop mode can be set to a mode in which the supply time of the cleaning water to at least one of the sample dispensing probe (113), the sample dispensing probe cleaning tank (113A), the reagent dispensing probe (116), the reagent dispensing probe cleaning tank (116A) and the cleaning mechanism (115A) is shorter than the supply time during the measurement of the sample. Accordingly, the cleaning time of the cleaning water is changed, so that even when the mode is changed, the operation can be automatically performed such that the discharge amount is the same amount.

In a large-sized automatic analyzer in which the time of one cycle is often short, there may be an overlapping section (901) within the time during which, among the cleaning water in one cycle, the cleaning water including the blank water (403), the system water (404), and the sample dispensing probe inside cleaning water (405) is discharged.

Therefore, when entering the quasi-stop mode (402), the sample dispensing probe inside cleaning water (405) is stopped, so that the water pressure of the blank water (403) and the system water (404) which continue discharging the cleaning water becomes high, and the cleaning water is discharged more than a specified amount.

In order to cope with such a case, when it is detected that the apparatus enters the quasi-stop mode at a control timing of the reaction vessel cleaning control unit (505) at the time of entering the quasi-stop mode, an operation (902) in which the discharge time of the cleaning water is shortened by shortening an opening time of a valve is performed, and switching is performed such that the discharge amount is maintained to be the same before and after the quasi-stop mode.

When the apparatus returns from the quasi-stop mode to the operation, the operation of the sample dispensing probe inside cleaning water (405) is started, and therefore, the operation (903) is switched returning to an original cleaning water discharge time.

Other configurations and operations are substantially the same as those of the automatic analyzer and the method of operating the automatic analyzer according to the first embodiment described above, and detailed descriptions thereof will be omitted.

Also in the automatic analyzer and the method of operating the automatic analyzer according to the fourth embodiment of the invention, substantially the same effects as those of the automatic analyzer and the method of operating the automatic analyzer according to the first embodiment described above can be exerted.

In the quasi-stop mode, the supply time of the cleaning water to at least one of the sample dispensing probe (113), the sample dispensing probe cleaning tank (113A), the reagent dispensing probe (116), the reagent dispensing probe cleaning tank (116A) and the cleaning mechanism (115A) is shorter than the supply time during the measurement of the sample, even when the specified amount of the cleaning water operating in the quasi-stop mode cannot be discharged, the apparatus can automatically change the cleaning water discharge time to always keep a constant discharge amount, so that the performance equivalent to the operation can be maintained.

Also in the present embodiment, it is possible to adopt a switching button or setting tab similar to a switching button for setting cleaning water presence and absence (602) for selecting whether to execute the process of shortening the discharge time (the supply time) of the cleaning water as in the second embodiment, and a cleaning water stop condition setting tab (603) and a cleaning water start condition setting tab (604) for selecting the supply timing as in the third embodiment.

Further, a chart for shortening the discharge time (the supply time) of the cleaning water as in the present embodiment and a chart for stopping the supply of the cleaning water described in the first embodiment can be used in combination.

Fifth Embodiment

An automatic analyzer and a method of operating the automatic analyzer according to a fifth embodiment of the invention will be described with reference to FIG. 14. FIG. 14 is a time chart of the cleaning water in the automatic analyzer according to the fifth embodiment.

The automatic analyzer according to the present embodiment is different from those of the first and fourth embodiments, and the quasi-stop mode is a mode in which a supply interval of the cleaning water to at least one of the sample dispensing probe (113), the sample dispensing probe cleaning tank (113A), the reagent dispensing probe (116), the reagent dispensing probe cleaning tank (116A) and the cleaning mechanism (115A) is longer than the supply interval during the measurement of the sample.

In such a case, as shown in FIG. 14, in the operation (401) state, when the output of all the measurement results is completed, the cleaning with the system water (404), the reagent dispensing probe inside cleaning water (407), and the reagent dispensing probe outside cleaning water (408) for which the condition (C) is set is stopped, and the operation (401) state is transitioned to the quasi-stop mode (402).

In the quasi-stop mode (402), the supply of the blank water (403) is continued. Further, the supply of the sample dispensing probe inside cleaning water (405) and the sample dispensing probe outside cleaning water (406) is set at one timing in two cycles, and the supply is continued after an interval.

Other configurations and operations are substantially the same as those of the automatic analyzer and the method of operating the automatic analyzer according to the first embodiment described above, and detailed descriptions thereof will be omitted.

As in the fifth embodiment of the invention, in the quasi-stop mode, the supply interval of the cleaning water to at least one of the sample dispensing probe (113), the sample dispensing probe cleaning tank (113A), the reagent dispensing probe (116), the reagent dispensing probe cleaning tank (116A) and the cleaning mechanism (115A) is longer than the supply interval during the measurement of the sample, so that substantially the same effects as those of the automatic analyzer and the method of operating the automatic analyzer according to the first embodiment described above can be exerted.

Also in the present embodiment, it is possible to adopt a switching button or setting tab similar to the switching button for setting cleaning water presence and absence (602) for selecting whether to execute the process of shortening the discharge time (the supply time) of the cleaning water as in the second embodiment, and the cleaning water stop condition setting tab (603) and the cleaning water start condition setting tab (604) for selecting the supply timing as in the third embodiment.

Further, a chart for shortening the discharge interval of the cleaning water as in the present embodiment, a chart for stopping the supply of the cleaning water described in the first embodiment, and a chart for shortening the discharge time described in the fourth embodiment can be used in combination.

Others

The invention is not limited to the above embodiments, and includes various modifications. The above embodiments have been described in detail for easy understanding of the invention, and are not necessarily limited to those including all the configurations described above.

In addition, a part of the configuration of an embodiment may be replaced with the configuration of another embodiment, and the configuration of an embodiment may also be added with the configuration of another embodiment. In addition, a part of the configurations of the embodiments may be added to, deleted from, or replaced with another configuration.

REFERENCE SIGN LIST

100 automatic analyzer
101 conveyance module
102 rack supply tray
103 rack buffer
104 sample rack
105 conveyance line
106 rack storage tray
107 input unit
108 display unit
109 memory unit
111 analysis module
112 sample dispensing line
113 sample dispensing probe
113A sample dispensing probe cleaning tank
114 electrolyte measurement unit
115 reaction disk
115A cleaning mechanism
116 reagent dispensing probe
116A reagent dispensing probe cleaning tank
117 reagent disk
118 biochemical measurement unit
120A cleaning water tank (water supply mechanism)
120B syringe pump (water supply mechanism)
120C cleaning water supply pipe (water supply mechanism)
121 operation module
122 control unit
401 operation
402 quasi-stop mode
403 blank water
404 system water
405 sample dispensing probe inside cleaning water
406 sample dispensing probe outside cleaning water
407 reagent dispensing probe inside cleaning water
408 reagent dispensing probe outside cleaning water
501 quasi-stop mode setting memory
502 quasi-stop mode condition table
503 quasi-stop mode operation determination unit
504 measurement status management unit
505 reaction vessel cleaning control unit
506 sample dispensing probe control unit
507 reagent dispensing probe control unit
601 cleaning water stop and start condition setting screen (first setting unit)
602 switching button for setting cleaning water presence and absence (first setting unit)
603 cleaning water stop condition setting tab (second setting unit)
604 cleaning water start condition setting tab (second setting unit)
605 setting registration button
610 quasi-stop mode execution selection screen (third setting unit)
611 Yes button
612 No button
620 cleaning water stop and start condition setting screen (second setting unit)
901 overlapping section of cleaning water discharge timing in operation
902 cleaning water discharge operation when entering quasi-stop mode
903 cleaning water discharge operation when returning to operation

The invention claimed is:

1. An automatic analyzer configured to perform qualitative and quantitative analysis of a liquid obtained by reaction of a sample and a reagent, the automatic analyzer comprising:

a reaction disk that includes a reaction vessel for reaction of the sample with the reagent;

a sample dispensing probe configured to dispense the sample to the reaction vessel on the reaction disk;

a sample dispensing probe cleaning tank configured to clean an outer periphery of the sample dispensing probe after the sample is dispensed;

a reagent dispensing probe configured to dispense the reagent to the reaction vessel on the reaction disk;

a reagent dispensing probe cleaning tank configured to clean an outer periphery of the reagent dispensing probe after the reagent is dispensed;

a cleaning mechanism configured to clean the reaction vessel after a measurement of the sample is completed;

a water supply mechanism configured to supply cleaning water to the sample dispensing probe, the sample dispensing probe cleaning tank, the reagent dispensing probe, the reagent dispensing probe cleaning tank and the cleaning mechanism;

a control unit configured to make a determination that the sample is not analyzed by the automatic analyzer and the automatic analyzer is in a standby state, in which a measurable state is maintained wherein the measurement of the sample is acceptable, and, based on the determination, to execute a quasi-stop mode in which supply of the cleaning water supplied by the water supply mechanism to at least one of the sample dispensing probe, the sample dispensing probe cleaning tank, the reagent dispensing probe, the reagent dispensing probe cleaning tank and the cleaning mechanism is reduced but not completely stopped and a supply amount of the cleaning water supplied by the water supply mechanism in the standby state is controlled to be smaller than a supply amount of the cleaning water supplied by the water supply mechanism during outputting of measurement results of the measurement of the sample; and a quasi-stop mode execution selection screen for selecting whether to execute the quasi-stop mode, wherein the quasi-stop mode is a mode in which, based on a quasi-stop mode condition table in which setting conditions of a stop condition and a start condition of the cleaning water are stored, supply of the cleaning water to at least one of the sample dispensing probe, the sample dispensing probe cleaning tank, the reagent dispensing probe, the reagent dispensing probe cleaning tank and the cleaning mechanism is stopped, and supply of the cleaning water to a different one or more of the at least one of the sample dispensing probe, the sample dispensing probe cleaning tank, the reagent dispensing probe, the reagent dispensing probe cleaning tank and the cleaning mechanism is continued, and the control unit further configured to, in the quasi-stop mode, individually stop and continue supplying cleaning water to the sample dispensing probe cleaning tank, the reagent dispensing probe, the reagent dispensing probe cleaning tank, and the cleaning mechanism.

2. The automatic analyzer according to claim 1, further comprising:

a first setting unit for individually receiving a setting indicating whether to supply the cleaning water to the sample dispensing probe, the sample dispensing probe cleaning tank, the reagent dispensing probe, the reagent dispensing probe cleaning tank and the cleaning mechanism in the quasi-stop mode.

3. The automatic analyzer according to claim 1, further comprising:

a second setting unit for individually receiving a setting indicating a timing to enter the standby state for transition to the quasi-stop mode, and a timing to start the measurement to transition to an operation state for the sample dispensing probe, the sample dispensing probe cleaning tank, the reagent dispensing probe, the reagent dispensing probe cleaning tank and the cleaning mechanism.

4. The automatic analyzer according to claim 1, wherein the sample dispensing probe cleaning tank and the reagent dispensing probe cleaning tank are targets for reducing the supply amount of the cleaning water or stopping the supply of the cleaning water.

5. A method of operating an automatic analyzer that performs qualitative and quantitative analysis of a liquid obtained by reaction of a sample and a reagent, wherein based on a determination, by a control unit of the automatic analyzer, that the automatic analyzer is in a standby state, in which a measurable state is maintained wherein a measurement of the sample is acceptable, the automatic analyzer is operated in a quasi-stop mode in which supply of cleaning water supplied to a sample dispensing probe that dispenses the sample to a reaction vessel for reaction of the sample and the reagent, a sample dispensing probe cleaning tank that cleans an outer periphery of the sample dispensing probe after the sample is dispensed, a reagent dispensing probe that dispenses the reagent to the reaction vessel, a reagent dispensing probe cleaning tank that cleans an outer periphery of the reagent dispensing probe after the reagent is dispensed, and a cleaning mechanism that cleans the reaction vessel after the measurement is completed is reduced but not completely stopped, the supply of the cleaning water to at least one of the sample dispensing probe, the sample dispensing probe cleaning tank, the reagent dispensing probe, the reagent dispensing probe cleaning tank, and the cleaning mechanism is stopped, and the supply of the cleaning water to a different one or more of the at least one of the sample dispensing probe, the sample dispensing probe cleaning tank, the reagent dispensing probe, the reagent dispensing probe cleaning tank, and the cleaning mechanism is continued, and whether to execute the quasi-stop mode can be selected, and the control unit further configured to, in the quasi-stop mode, individually stop and continue supplying cleaning water to the sample dispensing probe cleaning tank, the reagent dispensing probe, the reagent dispensing probe cleaning tank, and the cleaning mechanism.

* * * * *